S. R. BERGMAN.
DYNAMO ELECTRIC MACHINE.
APPLICATION FILED JAN. 12, 1911.

1,267,838.

Patented May 28, 1918.
3 SHEETS—SHEET 1.

Witnesses

Inventor
Sven R. Bergman
by
His Attorney

S. R. BERGMAN.
DYNAMO ELECTRIC MACHINE.
APPLICATION FILED JAN. 12, 1911.

1,267,838.

Patented May 28, 1918.
3 SHEETS—SHEET 3.

Witnesses

Inventor
Sven R. Bergman
by his Attorney

UNITED STATES PATENT OFFICE.

SVEN R. BERGMAN, OF LYNN, MASSACHUSETTS, ASSIGNOR TO GENERAL ELECTRIC COMPANY, A CORPORATION OF NEW YORK.

DYNAMO-ELECTRIC MACHINE.

1,267,838.   Specification of Letters Patent.   Patented May 28, 1918.

Application filed January 12, 1911. Serial No. 602,205.

*To all whom it may concern:*

Be it known that I, SVEN R. BERGMAN, a subject of the King of Sweden, residing at Lynn, county of Essex, State of Massachusetts, have invented certain new and useful Improvements in Dynamo-Electric Machines, of which the following is a specification.

My invention relates to dynamo-electric machines and has for its object a novel arrangement and construction of parts whereby the machine is efficiently ventilated.

In one of its aspects my invention comprises a dynamo electric machine, the frame member of which has a substantially cylindrical internal periphery, a substantially square stator member secured in said frame and engaging the same at two or more points so as to form a plurality of distinct, longitudinally extending ventilating spaces, and a fan driven with the rotatable member for forcing cooling fluid through said ventilating spaces. By making the stator substantially square, I secure large ventilating passages without materially increasing the reluctance of the magnetic material of the stator member and am thus enabled to force through these spaces a large volume of cooling fluid at low pressure by means of a simple fan carried by the rotatable member.

In another aspect, my invention comprises a dynamo electric machine having a stator mounted in an outer supporting frame, an armature mounted on a shaft, and thin-walled heat-conducting inner coverings, which, in conjunction with the stator and the shaft, inclose the inner portion of the stator, the windings thereon and the armature. By thus inclosing the working parts of the machine, they are readily protected from dust and moisture and at the same time, the heat generated therein has but a comparatively short path to travel to reach the thin inner covering through which it readily passes and is dissipated by the outside air which has free access to its surface. I preferably cool the outer surface of the inner casing by blowing a stream of air between it and the outer supporting frame, and thus help to dissipate the heat.

Figure 1:
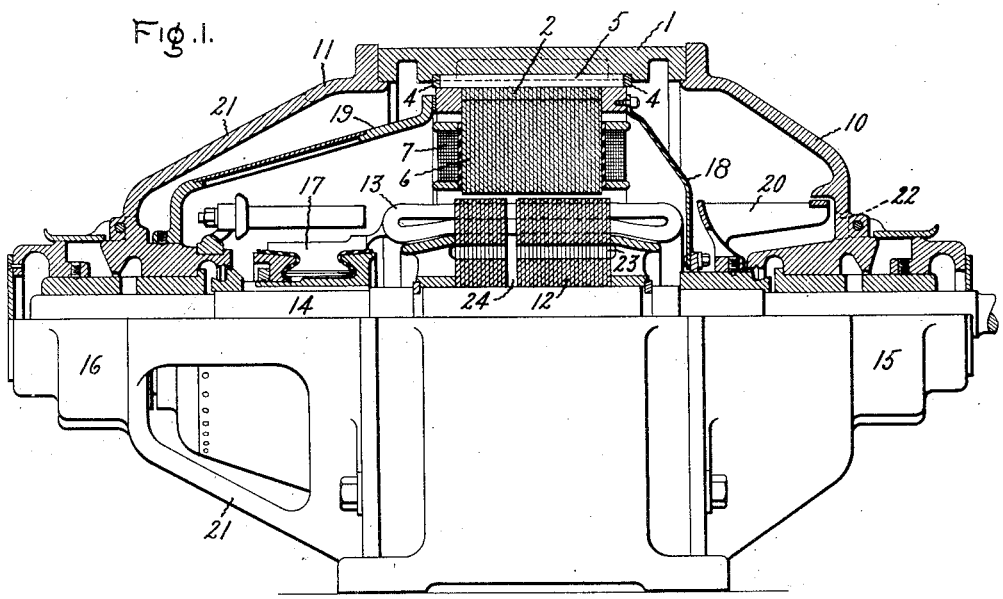
Figure 2:
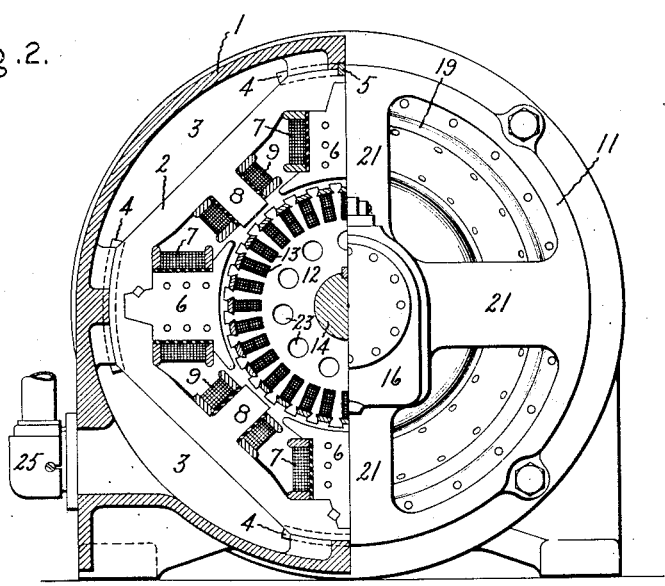
Figure 3:
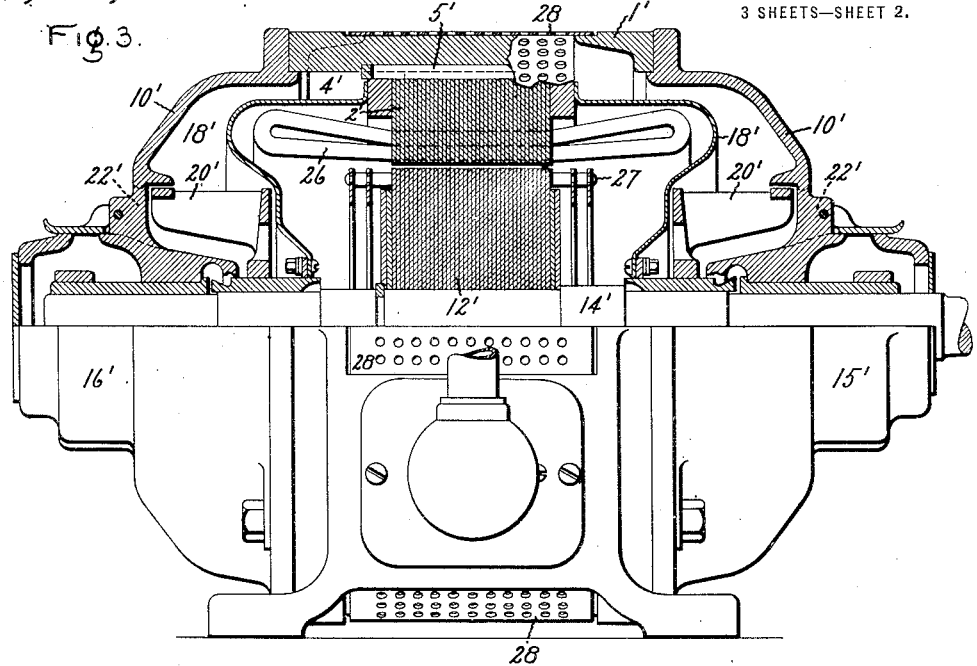
Figure 4:
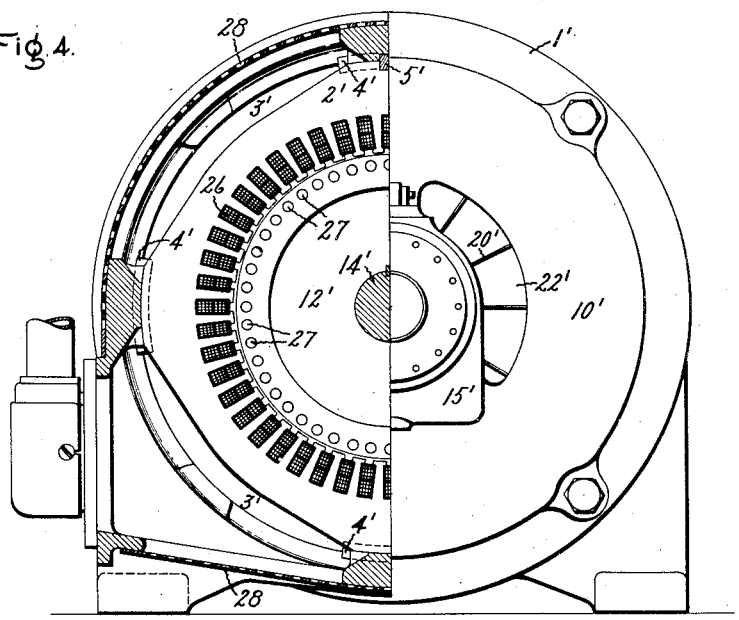
Figure 5:
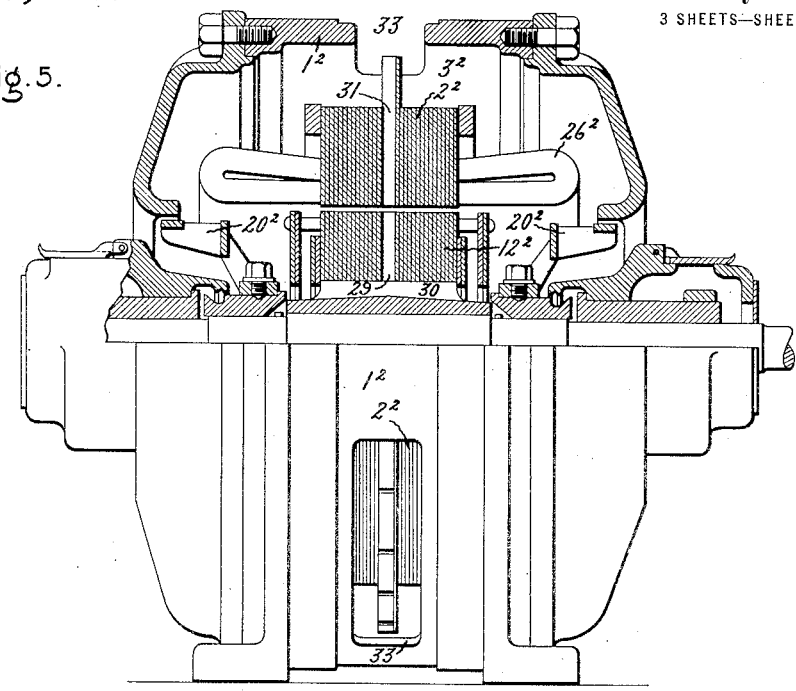
Figure 6:
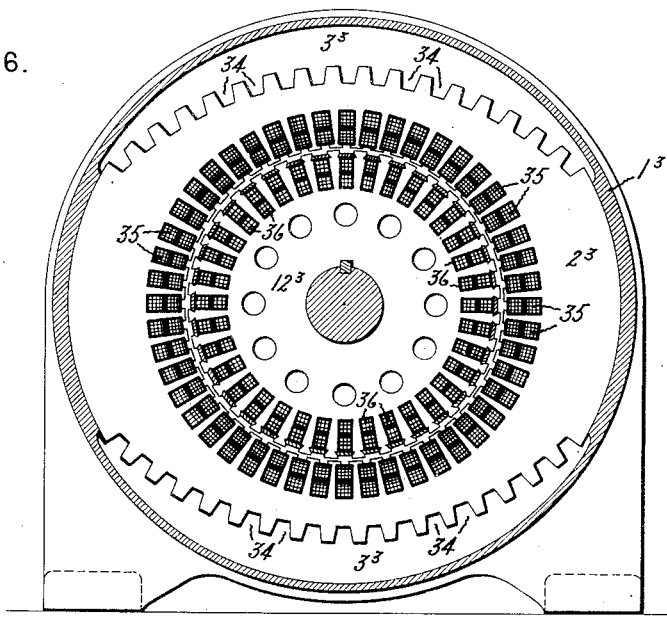

Other features of novelty which characterize my invention are pointed out with particularly in the claims annexed to and forming a part of this specification. For a better understanding of my invention, reference may be had to the following description taken in connection with the accompanying drawings, in which Figure 1 is a side view, partly in section, of a direct current dynamo-electric machine embodying my invention; Fig. 2 is an end view, partly in section, of the machine of Fig. 1; Fig. 3 is a side view, partly in section, of an alternating current dynamo-electric machine embodying by invention; Fig. 4 is an end view, partly in section, of the machine of Fig. 3; Fig. 5 is a side view of a dynamo-electric machine showing a modification; Fig. 6 is a sectional view of a dynamo-electric machine showing still another modification.

Similar reference numerals will be used throughout the specification and the several figures of the drawings to denote like parts.

In Figs. 1 and 2 of the drawings, I have shown a direct current dynamo-electric machine having an outer supporting frame 1, which has a substantially cylindrical internal periphery and has mounted and secured therein a substantially square field or stator member 2 engaging the same at two or more points, thereby forming a plurality of distinct, longitudinally extending ventilating spaces 3 between the interior surface of the frame 1 and the exterior surfaces of the member 2. A fan 20 is provided for forcing cooling fluid through the ventilating spaces 3. As shown the field member 2 is composed of substantially square laminations. These substantially square laminations or plates have rounded corners which fit in the frame and are held in place by keys 4 slipped in a slot after the laminations have been pressed into the frame 1. They are prevented from rotating by a key 5 which projects into one of the corners of the laminations where they touch the frame. Main pole pieces 6, provided with field windings 7, are detachably secured to the laminations. Commutating poles 8, provided with exciting windings 9, are shown as being made integral with the laminations. End frames 10 and 11 are fastened to the sides of the frame 1. A rotatable member 12 provided with a winding 13 is mounted upon a shaft 14 which is journaled in bearings 15 and 16 formed in the end frames. The winding 13 is connected to a commutator 17 also mounted on the shaft 14. Removable cover plates 18 and 19, in conjunction with the field member 2 and the armature shaft 14, inclose the inner portion of the member 2, the windings for the pole pieces, the rotatable member and the commutator and thus form a dust-proof casing for these parts. Driven with the rotatable member 12 is the fan 20, which is preferably mounted on the shaft 14 between the cover plate 18 and the corresponding end frame 10. The cover plate 18 is made of sheet metal while the cover plate 19 is made of a cast portion having openings therein, over which openings a sheet metal portion is fastened. The cover plate 18 and portions of the cover plate 19 are made of sheet metal and thus form thin-walled heat-conducting inner coverings for the inclosed parts of the machine. The end frame 11 has arms 21, between which are large openings. The end frame 10 has openings 22 about the bearing 15, which admit air to the fan. The fan forces air over the cover plate 18 through the ventilating spaces between the laminations and the frame 1 and out of the machine over the cover plate 19 through the openings in the end frame 11. If the cover plates are removed part of the air is also blown through ventilating spaces 23 and ducts 24 in the armature. The field and armature connections are brought out through a water tight terminal box 25.

In Figs. 3 and 4, I have shown my invention applied to an induction motor having a frame 1′ which is substantially cylindrical and has mounted therein a field member 2′ comprising substantially square laminations thereby forming ventilating spaces 3′ between the interior surface of the frame 1′ and the exterior surfaces of the member 2′. These laminations are held in place by keys 4′ and kept from rotating by a key 5′, in the same manner as explained in connection with Figs. 1 and 2. The inner periphery of the laminations is provided with slots in which windings 26 are placed. End frame members 10′ are fastened to the sides of the frame 1′. A rotatable member 12′, provided with a squirrel cage winding 27, is mounted on a shaft 14′. This shaft is journaled in bearings 15′ and 16′ in the end frames. Removable sheet metal cover plates 18′, in conjunction with the field member 2′ and the armature shaft 14′, inclose the windings 26 and the rotatable member 12′. In these figures I have shown two fans 20′ each mounted on the shaft 14′ between one of the cover plates 18′ and the corresponding end frame 10′. The end frames 10′ have openings 22′ about the bearings 15′ and 16′ which admit air to the fans 20′. These fans force air over the cover plates 18′ through the ventilating spaces 3′ between the laminations and the frame 1′ and out of the machine through openings in the frame, which I have shown as being covered by perforated plates 28. If the cover plates 18′ are removed the air will be blown against the rotating member 12′ and the windings 26, instead of over the cover plates 18′, whence it escapes through the ventilating spaces 3′ and out through the openings in the frame.

Fig. 5 shows an arrangement of parts very similar to that of Figs. 3 and 4, except that no cover plates are used; that the rotatable member $12^2$ has a radial ventilating duct 29 which communicates with longitudinal ventilating ducts 30 therein, and that the field member $2^2$ also has a radial ventilating duct 31. The radial ducts are made in the usual way by means of space blocks. The space block which forms duct 31 is circular and therefore extends beyond the laminations and into the ventilating spaces between the laminations and the frame $1^2$. The fans $20^2$ thus force part of the air past the windings $26^2$ through the ventilating spaces $3^2$ between the laminations and frame and out through the openings 33 in the frame. The portions of the space block which extend into the ventilating spaces $3^2$ direct the air through the openings 33. The other part of the air enters the longitudinal ducts 30, passes through the radial duct 29 in the rotatable member, then either passes out through the air gap past the windings $26^2$ or out through the radial duct 31 and the openings 33 in the frame.

In the modifications shown in Fig. 6, the frame $1^3$ is also substantially cylindrical and has mounted therein a field member $2^3$ which comprises substantially square laminations, two sides of the square being arcs of a circle concentric with the interior of the frame whereby only two ventilating spaces $3^3$ are formed between the frame and the member $2^3$. I have shown the exposed edges of the laminations with indentations 34 in order to increase their radiating surface. The laminations composing the field member have a winding 35 distributed in slots therein, while the rotatable member $12^3$ has a winding 36 distributed in slots in its periphery.

The outer supporting frame and the field or stator member mounted therein may be of any shape desired when used in connection with the thin-walled heat-conducting inner coverings, and I aim in the claims hereto appended, to cover such a modification as well as any others which do not involve a departure from the spirit and scope of my invention.

What I claim as new and desire to secure by Letters Patent of the United States, is,—

1. In a dynamo electric machine, a frame having a substantially cylindrical internal periphery, a substantially square stator member secured in said frame and engaging the same at two or more points so as to form a plurality of distinct longitudinally extending ventilating spaces between the interior surface of said frame and the exterior surfaces of said stator member, a rotatable member, and a fan driven with said rotatable member for forcing a cooling fluid through said ventilating spaces.

2. In a dynamo-electric machine, a frame, a member mounted therein having a different configuration than said frame and thereby forming ventilating spaces between said frame and said member, windings for said member, a rotatable member, cover plates inclosing said windings and the rotatable member, and means for forcing cooling fluid through said ventilating spaces.

3. In a dynamo-electric machine, a frame, end frames therefor, a member mounted in said frame having a different configuration than said frame and thereby forming ventilating spaces between said frame and said member, windings for said member, a shaft, a rotatable member mounted thereon, cover plates inclosing said windings and the rotatable member, a fan mounted on said shaft between one of said cover plates and the corresponding end frame for forcing cooling fluid through said ventilating spaces.

4. In a dynamo-electric machine, a frame having openings therein, end frames therefor, a member mounted in said frame having a different configuration than the frame and thereby forming ventilating spaces between said frame and said member, windings for said member, a shaft, a rotatable member mounted thereon, cover plates inclosing said windings and said rotatable member, and fans mounted on said shaft between each of said cover plates and the corresponding end frame for forcing cooling fluid through said ventilating spaces and out of said openings in said frame.

5. In a dynamo-electric machine, a substantially cylindrical frame having openings therein, end frames therefor, a substantially square member mounted in said frame and thereby forming ventilating spaces between said frame and said member, windings for said member, a shaft, a rotatable member mounted thereon, cover plates inclosing said windings and said rotatable member, and fans mounted on said shaft between each of said cover plates and the corresponding end frame for forcing cooling fluid through said ventilating spaces and out of said openings in said frame.

6. A dynamo electric machine, a frame member having a substantially cylindrical internal periphery, a laminated core member composed of a plurality of substantially square plates having their corners rounded to fit the frame, said core member being secured in said frame and so assembled as to form a plurality of distinct, longitudinally extending ventilating spaces between the interior surface of the frame and the exterior surfaces of the core member, a rotatable member, and a fan driven with said rotatable member for forcing cooling fluid through said ventilating spaces.

7. A dynamo-electric machine having, in combination, an outer supporting frame, a stator mounted therein, field windings on said stator, an armature, an armature shaft, and thin-walled heat-conducting inner coverings which, in conjunction with the stator and the shaft, inclose the inner portion of said stator, the armature and the field windings.

8. A dynamo-electric machine having, in combination, an outer supporting frame, a stator mounted therein, field windings on said stator, an armature, an armature shaft, thin-walled heat-conducting inner coverings which, in conjunction with the stator and the shaft, inclose the inner portion of said stator, the armature and the field windings, and blowing means for causing a cooling circulation of air within the supporting frame and over the outer surfaces of the inner coverings.

9. An electric motor or generator having, in combination, an outer supporting frame, an armature supported by said frame, a dust-proof casing having thin-walled heat-conducting portions for covering rotating parts of the machine, and blowing means for causing a cooling circulation of air over the outer surface of the covering means, substantially as described.

10. An electric motor or generator having, in combination, an outer supporting frame, a field magnet and armature supported thereby, a dust-proof casing having thin-walled heat-conducting portions for covering rotating parts of the motor or generator, and blowing means for causing a cooling circulation of air over the outer surface of the covering means, substantially as described.

In witness whereof, I have hereunto set my hand this tenth day of January, 1911.

SVEN R. BERGMAN.

Witnesses:
JOHN A. McMANUS, Jr.,
CHARLES A. BARNARD.